Aug. 12, 1947.　　H. W. KUEHN ET AL　　2,425,699
DEVICE FOR DEEP FAT FRYING
Filed May 31, 1943　　2 Sheets-Sheet 1
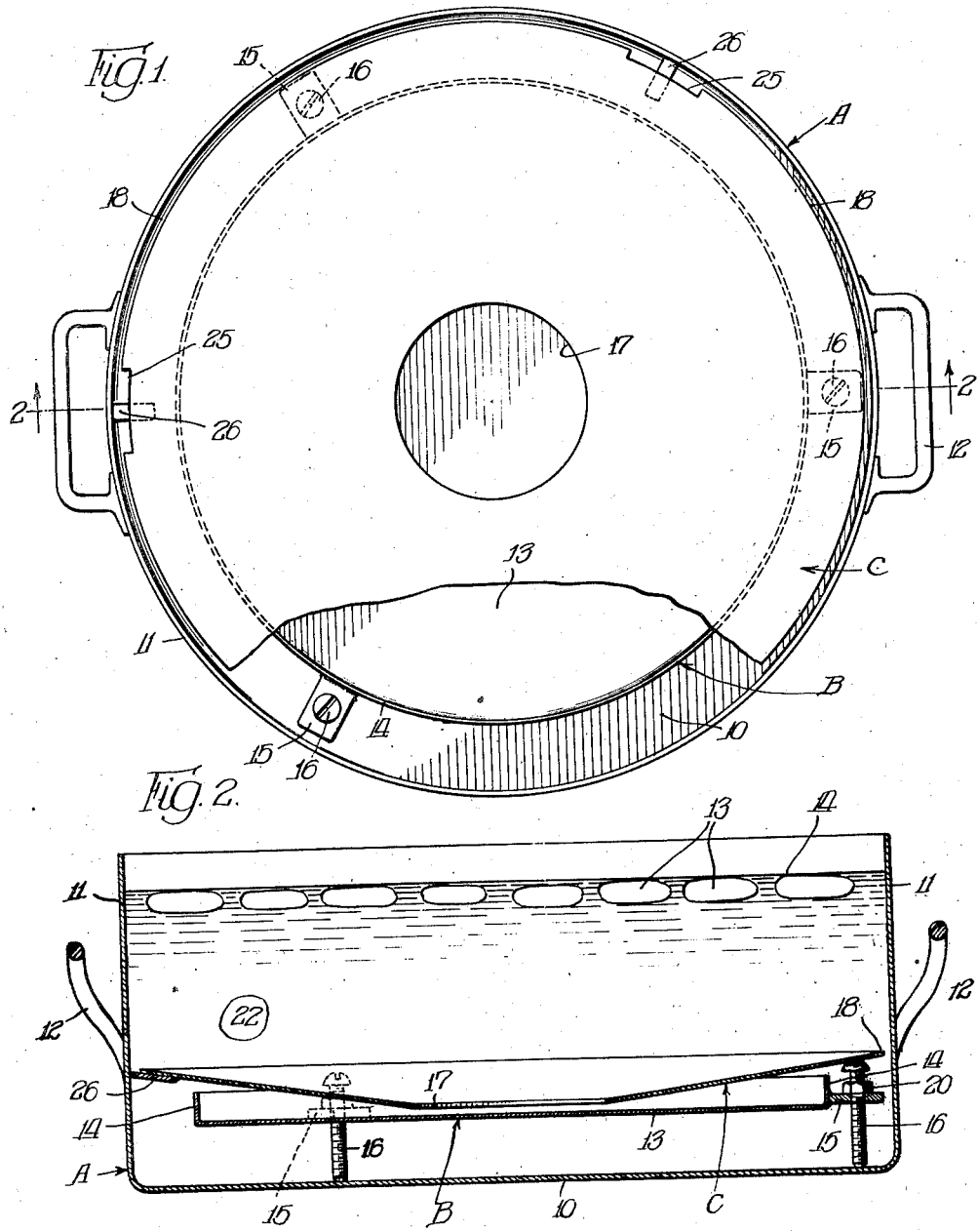
INVENTOR.
Homer W. Kuehn and
BY Fred G. Wheeler,
Carl C. Batz

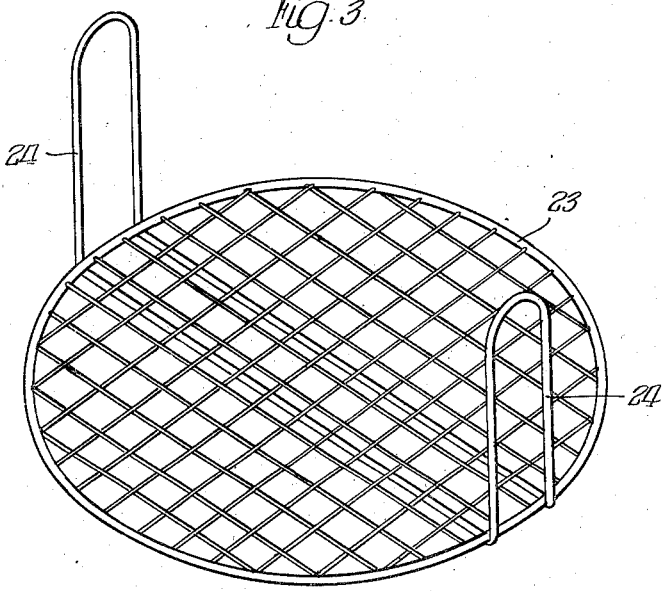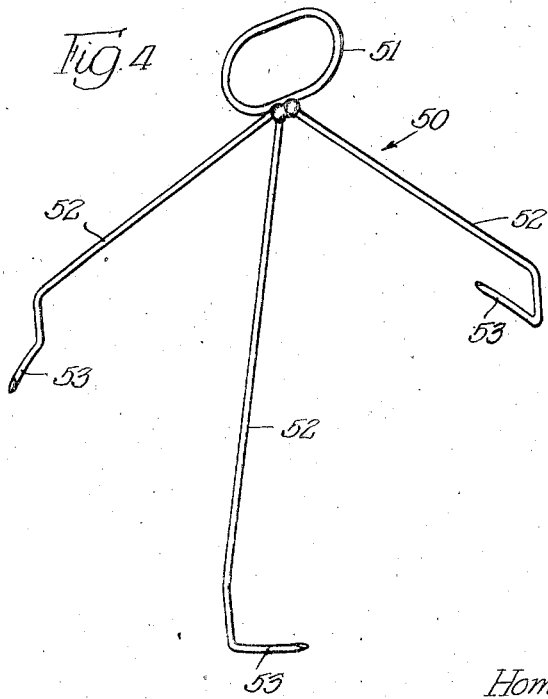

Patented Aug. 12, 1947

2,425,699

UNITED STATES PATENT OFFICE 2,425,699

DEVICE FOR DEEP FAT FRYING

Homer W. Kuehn and Fred G. Wheeler, Chicago, Ill., assignors to Armour and Company, Chicago, Ill., a corporation of Illinois Application May 31, 1943, Serial No. 489,178

10 Claims. (Cl. 99—408)

This invention relates to a device for deep fat frying and more particularly to a special structure for catching the solid particles or drippings from the food being cooked.

One of the common ways of cooking food is by deep fat frying and familiar examples of this is the frying of doughnuts and fritters or the like, or the frying of potatoes, commonly called French fried potatoes, etc. In this manner of cooking the food is either immersed or partially immersed in the hot fat.

Deep fat frying is commonly done in bakeries, restaurants and homes by simply providing a kettle or other container which will hold a body of fat and which is heated at its bottom. The doughnuts, for example, may be placed on a screen or perforated plate and this dropped into the kettle to bring the doughnuts into contact with the fat. The doughnuts may then be turned when necessary. Other foods like potatoes may be placed in a mesh dipper and this suspended into fat until cooked.

Meat also may be cooked by this method, and may be dipped in egg mixture, coated with crumbs, and then suspended in the fat until cooked.

While the food is being cooked in this way bits of it become detached and fall into the vessel. In making doughnuts, for example, the dough is usually coated with flour prior to frying, and bits of flour become separated in the fat and fall to the bottom of the container.

As a result of this drippage solids build up on the bottom of the container, forming a heat-insulating layer. One of the effects of this heat-insulating layer is to increase the difference in temperature between the top layers of the fat and the lower points in the container, and this necessarily means that excessive temperatures must be maintained at the bottom in order to hold proper cooking temperatures in the top layers. Also, the flour or other precipitated solids, being exposed to severe heat, quickly begin to break down and become dark in color, unpleasantly odorous, and bitter in taste. These undesirable colors, odors and tastes are imparted to the fat and quickly render it unsatisfactory for further use.

An object of the present invention is to provide a device which will overcome the objectionable effects above described. A further object is to provide a device which is simple in construction and operation and which can be used without variation in the formulae or general routine of ordinary deep fat cooking operations. Other objects will be apparent after the following detailed description:

An embodiment of the invention is illustrated in the accompanying drawing in which Fig. 1 is a plan view of the device showing one portion broken away to expose the various parts; Fig. 2 is a sectional view in elevation taken as indicated at line 2 of Fig. 1; Fig. 3 is a perspective view of a typical doughnut screen; and Fig. 4 is a perspective view of a lifter device.

As illustrated, the device comprises a vessel or container A inside of which is collecting apparatus including a pan B and baffle plate C.

The container may be of any suitable construction, and may be the same kettle or vessel as has been used by the bakers or restaurateurs in their past practices. The container here shown is cylindrical in form, having a flat circular bottom 10 and cylindrical sides 11. Handles 12 are provided for ease in carrying. This container is adapted to hold the fat 13 which may have a top level such as indicated at 14. Heat may be applied to the bottom 10 and the fat heated in this way.

Within container A and spaced from the bottom 10 is the collecting device which includes the pan B. In the embodiment shown, this pan is circular in form, having a flat bottom 13 and vertical upturned edges 14. Attached to the edges are the outwardly projecting lugs 15. Bolts or studs 16 screw into openings in the lugs 15 and extend downwardly with their ends resting on the bottom 10. The pan B is thus supported and held in spaced relation to the container bottom. Three such lugs and studs are sufficient for support, but more may be employed if desired. In addition to this function as supporting means the lugs 15 serve to properly space the pan B within the container.

Over pan B is the plate or baffle member C. This plate has a central opening 17 over the pan B, preferably at about the center of the pan B. As shown, this plate may have its outer edges 18 extending almost to the sides of the container, and preferably should be inclined downwardly from these edges toward the central opening 17 to provide a frusto conical surface. However, this plate may be in the form of a flat disk having a central opening, if so desired.

The plate C should have its edges 18 extending beyond the edges 14 of pan B and this plate may conveniently rest on the tops of the studs 16, this being a good means of support. This plate may suitably have cutaway points 25 and lugs 26. These lugs permit easy removal of the plate when desired and also serve to center the plate properly within the container. Of course the general shape of the pans B and C should conform to the general shape of the container, and when a rectangular container is used the plate and pan may also be of rectangular shape.

The plate C should be spaced from the top of the vertical edges 14 of pan B by a relatively small distance. Using a plate of about 15 inches in diameter it has been found satisfactory to have the plate spaced about ¼ inch from the top of the sides 14. There should also be a space between the plate and the pan at the opening 17. For a plate of 15 inches in diameter it has been found satisfactory to have the plate about ½ inch from the pan at this point. It is preferable that the opening 17 of the plate C be somewhat below the top of the edges 14 of pan B.

The adjustment of the spacing between pan B and the plate C, and also between the pan B and the bottom of the container, may be accomplished through turning of the studs 16. Lock nuts 20 are provided for securing this adjustment.

For easy removal of the plate B and pan C we provide the lifter 50. As seen from Fig. 3 this device has a handle 51 to which is secured the fingers 52. The ends of the fingers 52 have the lateral lugs 53. In use the fingers 52 are passed through the openings 25 and the ends 53 engage or hook over the lugs 26 to permit the plate C to be raised by lifting the handle 51. This lifter may also be used to raise the pan B through engagement of the ends 53 with the lugs 15. Also both the plate and pan may be raised at the same time if so desired. This device also may be utilized for lowering the pan and plate into the kettle as well as for lifting it.

In the operation of the device, fat is put into the container A to some such level as 14 and heat applied to the bottom 10 by an open flame or in any other suitable way. When the fat has reached the desired temperature for cooking, the material to be cooked is put into the vessel. In the case of doughnuts, the formed dough which may be coated with flour can be placed on a screen or mesh support such as that designated 23 in the drawing, and this may then be put into the container, the doughnuts staying somewhat at the surface and the screen being allowed to rest on the plate C. Doughnuts 21 in the process of being cooked are shown in Fig. 2. When the doughnuts are cooked the screen 23 may be raised suitably by the handles 24 and the cooked doughnuts raised from the fat. In any case, there is an area in the body of the fat where the fat is to be in contact with the surfaces of the food, and this areas will be called the cooking area, generally designated by the character 22.

Any flour or other solids which become detached from the food being cooked in area 22 will fall with the cooled fat slowly down to the plate C. Some of the larger solid particles may come to rest on plate C, but most of the finer particles will pass on with the cooled fat centrally and downwardly through opening 17 onto the pan B. As the fat proceeds outwardly over pan B in a rolling motion the particles settle out on the bottom of this pan, and the fat passes over the edges 14 of pan B to be again heated through contact with the heating surface at the bottom of the container.

After being reheated the fat proceeds upwardly between the edges of the plate C and the sides 11 of the container to the cooking area where it again comes into contact with the food, and the cycle is again repeated.

While the passage between the plates C and sides 11 is convenient for permitting upward movement of the heated fat, it is possible to provide such a passage in other ways. For example, the plate C might have its edges 18 extending flush with the walls 11 of the container and be provided with openings near its periphery through which the heated fat might pass upwardly.

The flour or other solid matter is held either on plate C or pan B and so does not contact the container itself. There is no insulating layer built up adjacent the heating surface and as a result of this, the heating surface need not be so hot in order to maintain the desired temperature of fat. Another effect is to prevent the carbonizing of the solids which ordinarily takes place when the solid matter comes into contact with the heated surface, thus eliminating discoloration and the formation of bad odors and tastes.

Another effect of the improved apparatus is to promote convection of the fat within the container and thereby provide better heat transfer to the cooking area. In prior practices it was not uncommon to have a difference in temperature between the cooking area and the bottom points within the container of from 60° F. to 100° F. When using the device herein described it has been found that there is a difference in temperature of only about 10° F. to 15° F. between the cooking area and the bottom points in the container.

The collector structure including pan B and plate C receives and guides the fat, promoting its circulation through convection, but at the same time maintaining the fat coming from the cooking area in a quiescent or slightly rolling state until the solids have separated out and are held in this structure.

The solids retained in the collector may be toasted by the hot fat to a golden brown, but not being subjected to a heating surface or excessively hot temperatures they are not burned or broken down to form discolored or odoriferous bodies. As a result, by using our improved structure it is possible to use the same fat for a much longer period of time.

In a comparative test doughnuts were made in two containers over an extended period of time, one of the containers having therein the collecting structure consisting of pan B and plate C, and the other container being without such collecting structure. The same amount of doughnuts were cooked in each of the containers.

The fat from each container was removed and filtered at the end of each day. In the case of the container having the catching device, this device including plates B and C was removed prior to emptying the container by the use of the lifter 50. At the end of eight days the color of the fat in the container without the collector measured 150 yellow and 80 red on the Lovibond color scale, while the color of the fat in the container having the collector measured 35 yellow and 13 red on the Lovibond scale. Also, at the end of this eight-day period the fat in the container without the collector measured .66% free fatty acids while the fat in the container having the collecting means measured .25% free fatty acids. It is especially important to maintain a low free acid content since the temperature at which a fat will smoke is usually proportioned to the amount of free fatty acid contained.

While in the foregoing detailed description only one specific embodiment has been described, it is understood that the device may take different forms and variations all within the spirit of the invention.

What we claim as new and desire to secure by letters patent is:

1. A device for deep fat frying comprising a container having a heating surface and being adapted to hold frying fat to provide a deep fat cooking area, a collecting means, spaced from the bottom of said container for separating and retaining solids from said fat as the fat circulates from said area toward said surface, said means including a pan and a plate having a central opening over said pan, said pan and plate being imperforate except for said opening, said pan and plate being adapted to guide circulating fat along the top of said pan so that solids separating from the fat are retained on said pan, the space between said means and said bottom being free so as to permit the passage of fat therethrough.

2. A device for deep fat frying comprising a container having a heating surface and being adapted to hold frying fat to provide a deep fat cooking area, a pan in said container and spaced from the bottom thereof, the space between said pan and said bottom being free so as to permit the passage of fat therethrough, and baffle means, including a plate having a central opening spaced over said pan, for guiding fat from said cooking area slowly across said pan to permit settling of solid particles in said pan, said pan and plate being imperforate except for said opening.

3. A device for deep fat frying comprising a container having a heating surface at its bottom and being adapted to hold frying fat to provide a deep fat cooking area, a pan in said container and spaced from the bottom thereof, the space between said pan and said bottom being free so as to permit the passage of fat therethrough, and a plate over said pan, said plate having a central opening over said pan through which fat from said cooking area may pass onto said pan.

4. A device for deep fat frying comprising a container having a heating surface at its bottom end being adapted to hold frying fat to provide a deep fat cooking area, a pan in said container and spaced from the bottom thereof, the space between said pan and said bottom being free so as to permit the passage of fat therethrough, the area of the bottom of said pan being smaller than the area of the bottom of said container, and a plate having an opening over said pan through which fat from said cooking area may pass downwardly onto said pan, said plate forming between its outer edges and the sides of said container a passage through which fat may pass upwardly to said cooking area.

5. A device for deep fat frying comprising a container having a heating surface and being adapted to hold frying fat to provide a deep fat cooking area, a vessel within said container and spaced from the walls thereof for retaining solid particles, the space between said pan and said walls being free so as to permit the passage of fat therethrough, and means, including a plate having a central opening spaced over said vessel, for guiding fat from said cooking area centrally and downwardly onto said vessel, said pan and plate being imperforate except for said opening, and passages outwardly of the edges of said vessel through which fat may pass upwardly past said vessel and into said cooking area.

6. A device as set forth in claim 4 wherein said plate is inclined downwardly from its outer edges toward its opening over said vessel.

7. A device for deep fat frying comprising a container having a heating surface at its bottom end being adapted to hold frying fat to provide a deep fat cooking area, a pan in said container and supported by studs in spaced position from the bottom of said container, and a plate supported by said studs above said pan and in spaced relation to said pan, said plate having a central opening over said pan through which fat from said cooking area may pass downwardly onto said pan and forming between its outer edges and the sides of said container a passage through which fat may pass upwardly to said cooking area.

8. Collecting apparatus for deep fat frying containers comprising a collecting vessel, means for supporting said vessel in spaced relation to the bottom of said container, the space between said vessel and said bottom being free so as to permit the passage of fat therethrough, and baffle means, including a plate having a central opening over said vessel for guiding circulating fat across said vessel.

9. Collecting apparatus for deep fat frying comprising a pan, stud means for supporting said pan in spaced relation to a heating surface, the space between said pan and said heating surface being free so as to permit the passage of fat therethrough, and a baffle plate supported by said stud means in spaced relation to said pan, said baffle plate being effective to guide circulating fat across said pan whereby solid particles in said circulating fat are permitted to settle from the fat and be retained in said pan.

10. Apparatus for deep fat frying comprising a container adapted to hold liquid fat therein, a collecting device, including baffle means, within said container and spaced from the bottom thereof for separating and retaining solids from said fat, said device including a pan and a plate having a central opening over said pan, said pan and plate being imperforate except for said opening, said device and said baffle means each having hook engaging means, and a lifting device provided with a handle portion and having projecting fingers having hook means adapted to engage said hook engaging means of said collecting device and of said baffle means whereby said collecting device may be removed from said container by the lifting of said handle, and said baffle means can separately be lifted from said container by separate engagement with said handle.

HOMER W. KUEHN.
FRED G. WHEELER.

REFERENCES CITED

The following references are of record in the file of this patent:

UNITED STATES PATENTS

| Number | Name | Date |
|---|---|---|
| 2,154,391 | Anderson | Apr. 11, 1939 |
| 1,996,434 | O'Dowd | Apr. 2, 1935 |
| 410,248 | Kimmell | Sept. 3, 1889 |
| 902,181 | Tidow | Oct. 27, 1908 |
| 2,136,535 | Anetsberger | Nov. 15, 1938 |
| 1,994,555 | Wilson | Mar. 19, 1935 |
| 1,880,603 | Vaglio | Oct. 4, 1932 |
| 1,025,630 | Von Krogoll | May 7, 1912 |